US011449005B2

(12) United States Patent
Gougoussis

(10) Patent No.: US 11,449,005 B2
(45) Date of Patent: Sep. 20, 2022

(54) HOLOGRAPHIC DECORATED GLASS FOR SCREEN COLOR MATCHING

(71) Applicant: Tesla, Inc., Austin, TX (US)

(72) Inventor: Christos Gougoussis, Cupertino, CA (US)

(73) Assignee: Tesla, Inc., Austin, TX (US)

( * ) Notice: Subject to any disclaimer, the term of this patent is extended or adjusted under 35 U.S.C. 154(b) by 102 days.

(21) Appl. No.: 16/368,359

(22) Filed: Mar. 28, 2019

(65) Prior Publication Data

US 2019/0302694 A1 Oct. 3, 2019

Related U.S. Application Data

(60) Provisional application No. 62/650,163, filed on Mar. 29, 2018.

(51) Int. Cl.
*G03H 1/22* (2006.01)
*G09G 3/20* (2006.01)

(52) U.S. Cl.
CPC ......... *G03H 1/2286* (2013.01); *G03H 1/2249* (2013.01); *G09G 3/2003* (2013.01); *G03H 2001/2263* (2013.01); *G03H 2222/34* (2013.01)

(58) Field of Classification Search
CPC ............... G03H 1/2286; G03H 1/2249; G03H 2222/34; G03H 2001/2263; G03H 2250/33; G03H 1/0005; G03H 1/0256; G03H 1/0244; G09G 3/2003; G02F 1/133502
USPC ............................................................. 359/9
See application file for complete search history.

(56) References Cited

U.S. PATENT DOCUMENTS

| | | | |
|---|---|---|---|
| 2002/0003637 A1* | 1/2002 | Watanabe | G03H 1/202 359/22 |
| 2017/0185038 A1* | 6/2017 | Aizawa | G03H 1/26 |
| 2018/0059320 A1* | 3/2018 | Miller | G02B 6/02142 |

FOREIGN PATENT DOCUMENTS

GB 2542455 A * 3/2017 ........... G03H 1/2645

* cited by examiner

*Primary Examiner* — Jade R Chwasz
(74) *Attorney, Agent, or Firm* — Knobbe, Martens, Olson & Bear, LLP

(57) ABSTRACT

Systems may reduce or eliminate the visibility of a boundary between the displaying portions of the system and the non-displaying portions of the system. An exemplary system includes a display screen including a plurality of pixels forming a first periodic structure and a frame surrounding at least a portion of the display screen. The frame may include a holographic structure having a second periodic structure. The first pitch of the first periodic structure may be within 0.5 percent to 20 percent of the second pitch of the second periodic structure.

22 Claims, 4 Drawing Sheets

HOLOGRAPHIC DECORATED GLASS FOR SCREEN COLOR MATCHING

This application claims priority to U.S. Provisional Application No. 62/650,163, entitled "HOLOGRAPHIC GLASS FOR SCREEN COLOR MATCHING," filed Mar. 29, 2018, the content of which is hereby incorporated by reference in its entirety.

FIELD

The present disclosure generally relates to holographic glass, and more specifically to holographic glass for screen color matching.

BACKGROUND

A typical display screen on a device does not occupy the entire surface of the device. As such, the boundary between a display screen and the non-displaying portions of the device may be readily visible. A technique to reduce the visibility of this boundary includes coloring the non-displaying portions of the device the same color as the display screen (i.e., pigment matching). However, because display screens typically have a periodic micro-structure (e.g., a pixelated structure), the color of the display screen may be dependent on the angle at which a viewer is looking at the display screen. The non-displaying portions of the device may be unable to match this angular color dependence of the display screen, resulting in a readily visible boundary between the display screen and the non-displaying portions of the device. Accordingly, there is a need for better color integration between the displaying portions of a device and the non-displaying portions of the device.

BRIEF SUMMARY

Exemplary systems and devices that may reduce or eliminate the visibility of a boundary between displaying portions of the system and non-displaying portions of the system are disclosed. An exemplary system includes a display screen including a plurality of pixels forming a first periodic structure and a frame surrounding at least a portion of the display screen. The frame may include a holographic structure having a second periodic structure. The first pitch of the first periodic structure may be within 0.5 percent to 20 percent of the second pitch of the second periodic structure.

FIGURES

DETAILED DESCRIPTION

The following description is presented to enable a person of ordinary skill in the art to make and use the various embodiments. Descriptions of specific systems, devices, methods, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Figure 1A:
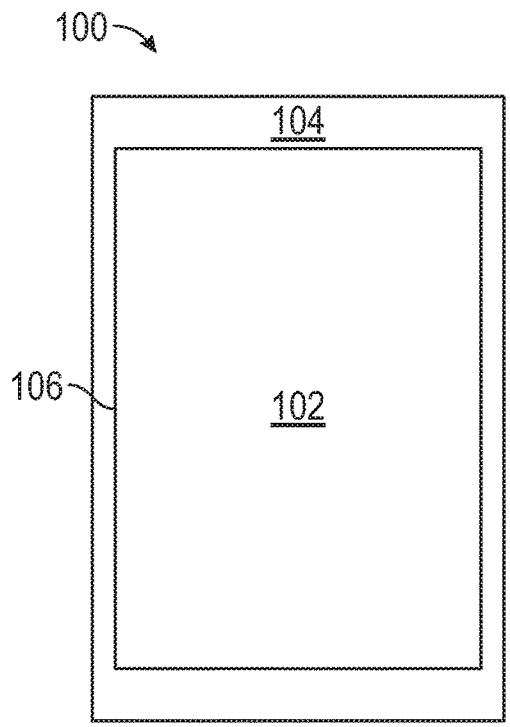
FIGS. 1A-1B depict views from two different viewing angles of a prior art system where pigment matching is used to match the color and appearance of the displaying portions of the system to the color and appearance of the non-displaying portions of the system.

FIG. 1A shows prior art system 100 including display 102 and surrounding frame 104 viewed from a first viewing angle normal to the surface of display 102. In system 100, frame 104 is pigmented so that its color and appearance approximately match the color and appearance of display 102. Display 102 is off (e.g., display 102 is not displaying or illuminating). Unless indicated otherwise, as used herein, the color and appearance of a display respectively refer to the color and appearance of a display when the display is off.

Display 102 includes an array of pixels forming a periodic structure. Due to this periodic structure, display 102 creates a holographic effect (e.g., the color and appearance of display 102 changes with the viewing angle at which display 102 is viewed). Because display 102 creates a holographic effect, pigmenting of frame 104 may be unable to change the color and appearance of frame 104 to match the color and appearance of display 102 within a broad range of viewing angles. Accordingly, merely using pigment matching to approximate the color and appearance of frame 104 to the color and appearance of display 102 may not adequately reduce the visibility of boundary 106 between frame 104 and display 102.

Figure 1B:
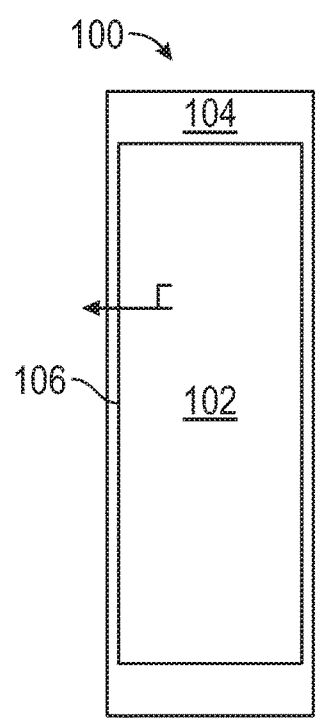

For example, as shown in FIG. 1A, when system 100 is viewed from the first viewing angle normal to the surface of display 102, boundary 106 between frame 104 and display 102 may be difficult to distinguish or be invisible to a viewer. However, as shown in FIG. 1B, when system 100 is viewed from a second viewing angle (e.g., a viewing angle not normal to the surface of display 102), boundary 106 between frame 104 and display 102 is readily visible.

Figure 2:
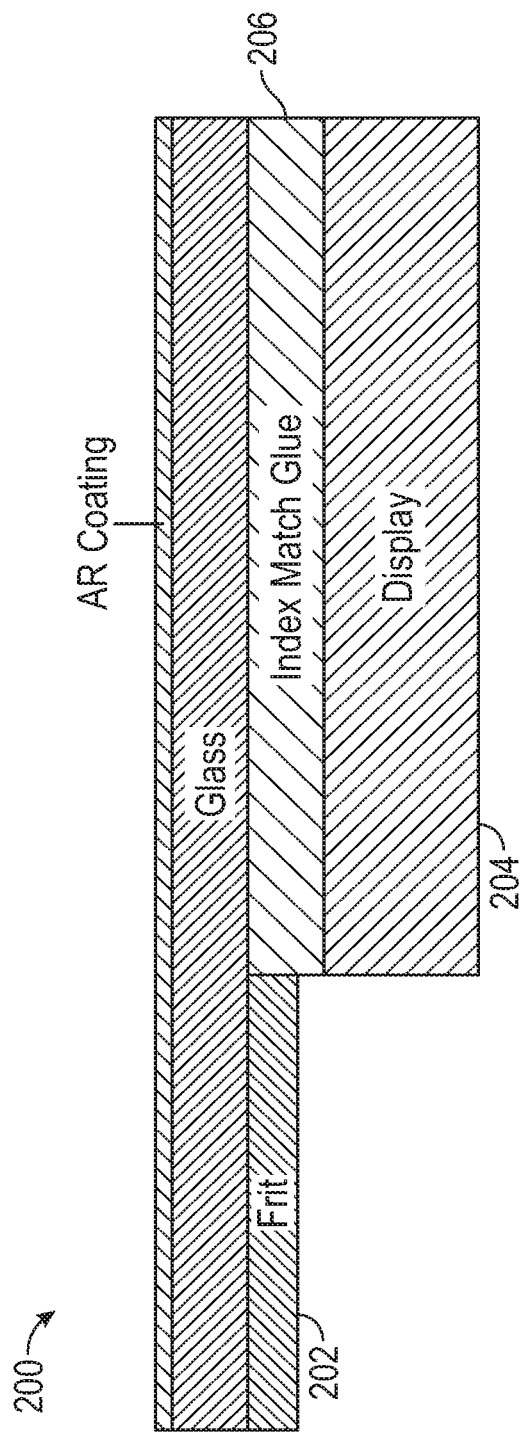
FIG. 2 shows a typical system used to match the color and appearance of the non-displaying portions of a system to the color and appearance of the displaying portions of the system.

FIG. 2 depicts a cross-sectional view of a typical system 200 used to match the color and appearance of the non-displaying portions of a system to the color and appearance of the displaying portions of the system via pigment matching. In this example, system 200 includes pigmented frame 202, display 204, and index match glue 206 that coats display 204.

Index match glue 206 may change the perceived color and appearance of display 204 to match the color and appearance of surrounding frame 202 within a small range of viewing angles. For example, index match glue 206 may change the perceived color and appearance of display 204 to match the color and appearance of frame 202 within a range of viewing angles approximately normal to the surface of display 204. However, due to the angular dependence of the perceived color and appearance of display 204 (due to display 204 having a holographic structure resulting from the pixels of display 204), index match glue 206 may be unable to change the perceived color and appearance of display 204 to match the color and appearance of frame 202 within a broad range of viewing angles so that the boundary between frame 202 and display 204 is invisible to a viewer. Accordingly, with display 204 coated with index match glue 206 surrounded by frame 202, the boundary between frame 202 and display 204 may still be readily visible at certain viewing angles.

Figure 3A:
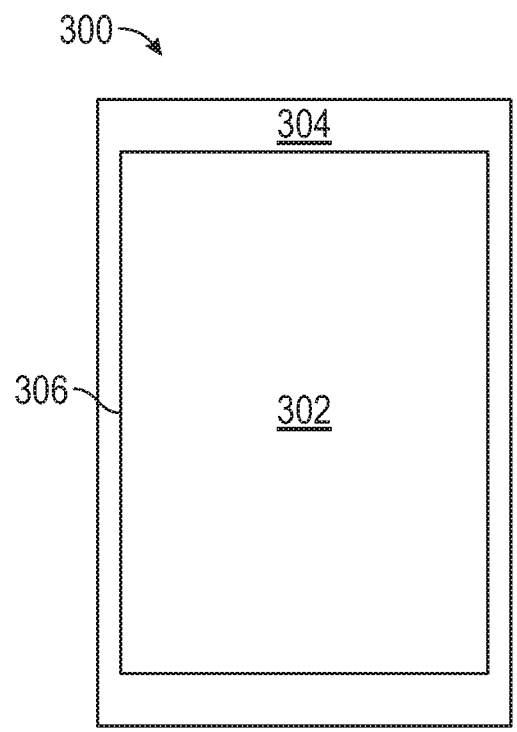
FIGS. 3A-3B depict views from two different viewing angles of a system where the visibility of the boundary between the non-displaying portions of the system and the displaying portions of the system is reduced (compared to conventional pigment matching, for example) or eliminated when viewed within a broad range of viewing angles.
Figure 3B:
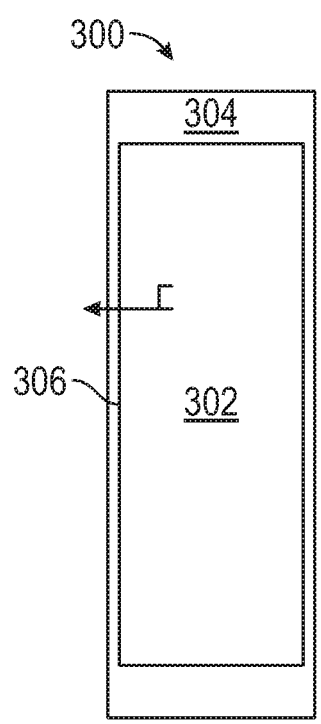

FIGS. 3A-3B respectively show views from a first viewing angle and a second viewing angle of system 300 according to some examples. In system 300, the visibility of boundary 306 between display 302 and the non-displaying portion (e.g., frame 304) is reduced (compared to if conventional pigment matching were used) or eliminated to a viewer viewing system 300 within a broad range of viewing angles. In particular, as shown in FIG. 3A, when system 300 is viewed at an angle normal to the surface of display 302, the visibility of boundary 306 is reduced or eliminated. As shown in FIG. 3B, when system 300 is viewed at an angle not-normal (e.g., a viewing angle differing from the normal viewing by about 40 degrees) to the surface of display 302, the visibility of boundary 306 is also reduced or eliminated.

Systems and techniques that may reduce or eliminate the visibility of the boundary between the displaying and the non-displaying portions of a system within a broad range of viewing angles (as depicted in FIGS. 3A-3B) are discussed below with respect to FIGS. 4 and 5.

Figure 4:
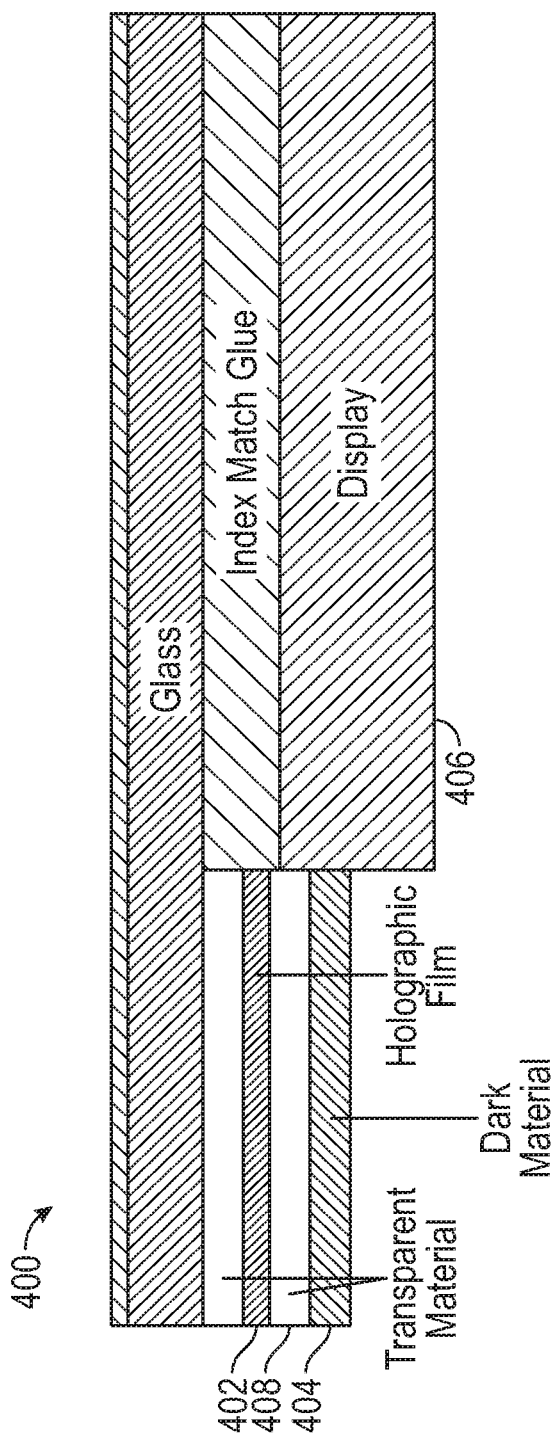
FIG. 4 shows an exemplary system where the display of the system is surrounded by a frame coated with holographic film.

As shown in FIG. 4, exemplary system 400 includes display 406 surrounded by frame 404. In one example, frame 404 includes a holographic structure, here a holographic film 402 containing a holographic structure. Generally, as stated above, display 406 includes a periodic structure therein as a result of the pixel elements, and by approximating or matching the periodic structures of display 406 with the periodic structures in holographic film 402, the visual appearance of the boundary between display 406 and frame 404 can be reduced over a far greater angle of incidence than the visual appearance of the boundary can be reduced using traditional pigment matching. Accordingly, by approximating or matching the periodic structure of the display 406 with the periodic structure of holographic film 402, the different portions of system 400 may vary in the same manner when viewed at different angles, thereby reducing or eliminating the visual appearance of the boundary to a viewer within a broad range of viewing angles (e.g., any viewing angle ranging from normal to the surface of display 406 to approximately parallel to the surface of display 406).

In some examples, holographic film 402 may be positioned in between two or more layers of transparent material 408. The holographic film 402 in between two or more layers of transparent material 408 may be disposed on frame 404. In other examples, holographic film 402 may be disposed directly on frame 404, without any intervening layers in between holographic film 402 and frame 404.

To reduce or eliminate the visual appearance of the boundary between display 406 and frame 404, the characteristics of holographic film 402 may depend on the characteristics of display 406. For example, the refractive index of holographic film 402 may depend on the refractive index of display 406.

To reduce or eliminate the visual appearance of the boundary between display 406 and frame 404, the periodic structure of holographic film 402 may approximate or match the periodic structure of display 406. The parameters describing the periodic structure of holographic film 402 (and similarly describing the periodic structure of display 406) may include:

the pitch of the periodic structure of holographic film 402 (e.g., the distance between identical features of the periodic structure of holographic film 402), the shape and size (including width, length, and height) of features (e.g., structures) that form the periodic structure of holographic film 402, the periodicity of features that form the periodic structure of holographic film 402, and the directionality of the periodic structure in holographic film 402.

Examples of how the periodic structure of holographic film 402 may approximate or match the periodic structure of display 406 are discussed below.

In one example, the pitch of the periodic structure of holographic film 402 may be within 0.5 percent to 20 percent (e.g., 0.5%, 1%, 1.5%, 2%, 5%, 10%, 15%, or 20%) of the pitch of the periodic structure of display 406, which may be the pixel size, distance between pixels, pixel clusters, or other physical features of display 406. In some examples, the pitch of the periodic structure of holographic film 402 may be less than 2 or 3 times the pixel size of display 406, or may be less than the pixel size of display 406 by 0.5 percent to 20 percent. For example, holographic film 402 may include a grid of square structures and the pitch of holographic film 402 may be the distance between the midpoints of two adjacent square structures. Therefore, the distance between the midpoints of the two adjacent square structures may be less than 2 or 3 times the distance between pixels or pixel clusters of display 406.

The shape and/or size of the features that form the periodic structure of holographic film 402 may approximate or match the shape and/or size of the features that form the periodic structure of display 406. For example, if display 406 includes of a grid of square pixels of a first length, holographic film 402 may include a grid of squares with lengths less than or equal to the first length.

The periodicity of features that form the periodic structure of holographic film 402 may approximate or match the periodicity of features (e.g., pixels) that form the periodic structure of display 406. For example, if display 406 includes a first repeating structure of two different cells (e.g., a pixel of a first color and a pixel of a second color) holographic film 402 may include a second repeating structure of two different cells. The structure of each cell of the second repeating structure may be the same as or different from the structure of each cell of the first repeating structure.

The directionality of the periodic structure of holographic film 402 may approximate or match the directionality of the periodic structure of display 406. For example, if display 406 includes a plurality of periodic features (e.g., pixels) oriented in a first direction (e.g., rectangles, triangles, or the like having a common orientation), holographic film 402 may include a plurality of periodic features oriented in the first direction.

Figure 5:
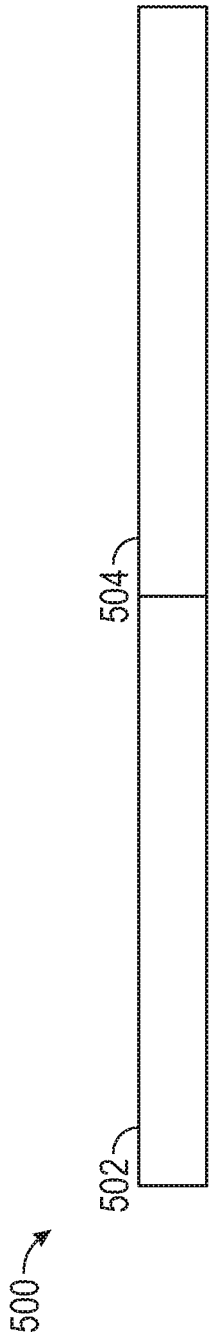
FIG. 5 shows an exemplary system where the display of the system is surrounded by a holographic glass panel.

FIG. 5 shows exemplary system 500 in which the visibility of a boundary between display 504 and a surrounding frame including a holographic structure (here holographic glass panel 502) may be reduced or eliminated over a broad range of viewing angles. In exemplary system 500, a periodic structure is formed on holographic glass panel 502 directly. For example, laser etching on holographic glass panel 502 may produce the periodic structure responsible for the holographic effect of holographic glass panel 502. Holographic glass panel 502 may include holographic structures formed in a variety of other ways, including ablation, etching, deposition processes, and the like.

It is to be understood that the characteristics of holographic film 402 and display 406 discussed above may respectively analogously describe the characteristics of holographic glass panel 502 and display 504. Similarly, the techniques of approximating or matching the periodic structure of holographic film 402 to the periodic structure of display 406 discussed above may analogously describe techniques for approximating or matching the periodic structure of holographic glass panel 502 to the periodic structure of display 504.

By surrounding display 406 with frame 404, the color and appearance of display 406 may match the color and appearance of frame 404 within an error tolerance for a range of viewing angles. Similarly, by surrounding display 504 with holographic glass panel 502, the color and appearance of display 504 may match the color and appearance of holographic glass panel 502 within an error tolerance for a range of viewing angles. Such surrounding of a display screen by frame 404 (or similarly by holographic glass panel 502) may reduce or eliminate the visibility of the boundary between the displaying and non-displaying portions of a system (i.e., the portions of a system which holographic film 402 coats or the portions of a system which holographic glass panel 502 covers.) As perceived by a viewer, this may result in a seamless display to non-display transition on systems with display screens.

The angular dependency of the color match between the displaying and non-displaying portions of systems (e.g., systems 300, 400, and 500) discussed above are now discussed. In some examples, as perceived by a viewer, the color of an object may be characterized by the perceptible wavelengths of light reflected by the object. Accordingly, the discussion below refers to the perceptible wavelengths of light reflected by the displaying and non-displaying portions of systems.

The perceptible wavelengths of light reflected by the non-displaying portions of the systems discussed above at a viewing angle of 40 degrees (e.g., 40 degrees from the normal to the surface of the non-displaying portion) may respectively match the perceptible wavelengths of light reflected by the displaying portions at a viewing angle of 40 degrees within 5-10 nm. For all viewing angles α less than 80 degrees, the perceptible wavelengths of light reflected by the non-displaying portions at viewing angle α, (where α<80 degrees) may match the perceptible wavelengths of light reflected by the displaying portions at the viewing angle α within 10 nm. 10 nm may represent a maximum acceptable wavelength difference between the perceptible wavelengths of light reflected by the displaying portions of a system and the perceptible wavelengths of light reflected by the non-displaying portions of a system. In other words, if the difference between the perceptible wavelengths of light reflected by the non-displaying portion of a system and the perceptible wavelengths of light reflected by the displaying portion of a system is greater than 10 nm, the boundary between the non-displaying portions and the displaying portions of the system may be visible.

In some examples, the perceptible color of an object may be characterized by one or more color values, (e.g., the CIE 1931 XYZ color space tristimulus values), as known by those skilled in the art. Accordingly, using the techniques discussed herein, the color values of the non-displaying portions of the systems discussed herein may respectively match the color values of the displaying portions of the systems within a suitable error tolerance over a range of viewing angles. The suitable error tolerance between color values may be defined such that a difference between the color values greater than the error tolerance results in the colors represented by the color values being visually distinguishable. For example, for all viewing angles less than 80 degree, the color values of the non-displaying portions of the system may match the color values of the displaying portions of the system within 1%, 2%, 5%, 10%, or 20%. In some examples, for all viewing angles less than 40 degrees, the color values of the non-displaying portions of the system may match the color values of the displaying portions of the system within 0.5%, 1%, 2%, 5%, or 10%.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best utilize the invention and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A system comprising:
a display screen comprising a plurality of pixels forming a first periodic structure; and
a frame surrounding four sides of the display screen, the frame comprising a holographic structure having a second periodic structure, wherein the first pitch of the first periodic structure is within 0.5 percent to 20 percent of the second pitch of the second periodic structure,
wherein perceptible wavelengths of light reflected by the display at a viewing angle of 40 degrees match the perceptible wavelengths of light reflected by the frame at a viewing angle of 40 degrees.

2. The system of claim 1, wherein the holographic structure comprises a substrate coated with a holographic film.

3. The system of claim 1, wherein the holographic structure only comprises holographic glass.

4. The system of claim 3, wherein the second periodic structure is formed by one of laser etching, ablation and deposition.

5. The system of claim 1, wherein the first pitch of the first periodic structure includes a pixel size of one or more pixels the plurality of pixels, and wherein the second pitch of the second periodic structure is less than the pixel size by 0.5 percent to 20 percent.

6. The system of claim 1, wherein the plurality of pixels are each oriented in a first direction, and wherein the holographic structure comprises a plurality of structures oriented in the first direction.

7. The system of claim 1, wherein the first pitch of the first periodic structure is within 0.5 percent to 2 percent of the second pitch of the second periodic structure.

8. The system of claim 1, wherein the holographic structure completely fills the frame surrounding the display screen.

9. The system of claim 1, wherein the holographic structure comprises a substrate coated with a holographic film, and the holographic film is positioned in between two or more layers of transparent material.

10. The system of claim 1, wherein the holographic structure comprises a substrate coated with a holographic film and wherein the holographic film is disposed directly on frame without any intervening layers in between the holographic film and the frame.

11. The system of claim 1, wherein the holographic structure comprises a substrate coated with a holographic film, and the refractive index of the holographic film matches the refractive index of display.

12. The system of claim 1, wherein the shape and size of the elements of the first periodic structure match the shape and structure of the elements of the second periodic structure.

13. The system of claim 1, wherein the periodicity of the elements of the first periodic structure match the periodicity of the elements of the second periodic structure.

14. The system of claim 1, wherein the first periodic structure is selected from the group consisting of: pixel size, distance between pixels, or pixel clusters.

15. The system of claim 1, wherein the first periodic structure has periodic features with a first directionality and the second periodic structure has features with a second directionality, and the first directionality matches the second directionality.

16. A system comprising:
a display screen comprising a plurality of pixels forming a first periodic structure; and
a frame surrounding four sides of the display screen, the frame comprising a holographic structure having a second periodic structure, wherein the first pitch of the first periodic structure is within 0.5 percent to 20 percent of the second pitch of the second periodic structure,
wherein perceptible wavelengths of light reflected by the display at a viewing angle α being of less than 80 degrees match the perceptible wavelengths of light reflected by the frame at the viewing angle α.

17. The system of claim 16, wherein the first pitch of the first periodic structure includes a pixel size of one or more pixels the plurality of pixels, and wherein the second pitch of the second periodic structure is less than the pixel size by 0.5 percent to 20 percent.

18. The system of claim 16, wherein the first pitch of the first periodic structure is within 0.5 percent to 2 percent of the second pitch of the second periodic structure.

19. The system of claim 16, wherein the holographic structure comprises a substrate coated with a holographic film, and the refractive index of the holographic film matches the refractive index of display.

20. The system of claim 16, wherein the shape and size of the elements of the first periodic structure match the shape and structure of the elements of the second periodic structure.

21. The system of claim 16, wherein the holographic structure comprises a substrate coated with a holographic film, and the holographic film is positioned in between two or more layers of transparent material.

22. The system of claim 16, wherein the holographic structure comprises a substrate coated with a holographic film and wherein the holographic film is disposed directly on frame without any intervening layers in between the holographic film and the frame.

* * * * *